Figure 1:
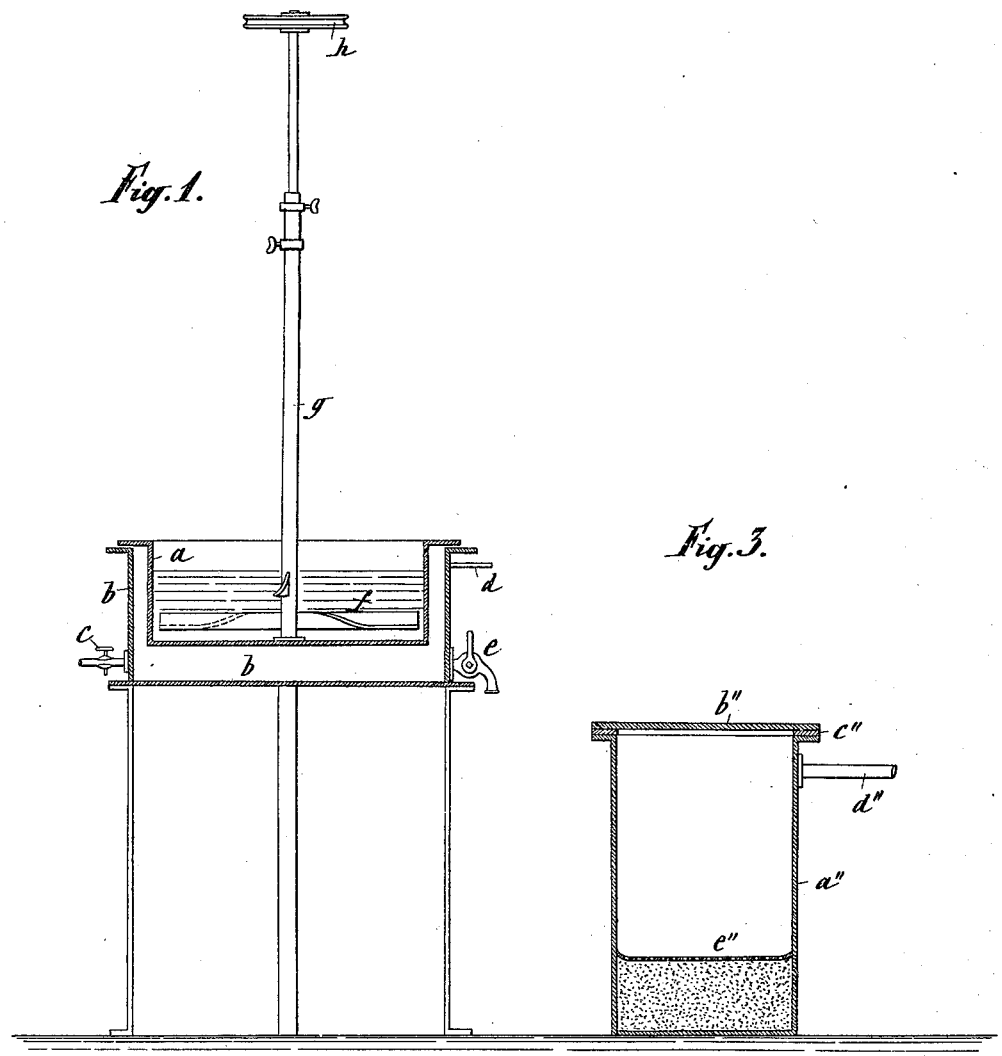

No. 684,920. Patented Oct. 22, 1901.
A. DENAEYER.
PROCESS OF MAKING COCOA PREPARATIONS.
(Application filed Aug. 8, 1899.)
(No Model.) 2 Sheets—Sheet 2.

WITNESSES:
INVENTOR
Alphonse Denaeyer
BY
Richards
ATTORNEYS

UNITED STATES PATENT OFFICE.

ALPHONSE DENAEYER, OF BRUSSELS, BELGIUM.

PROCESS OF MAKING COCOA PREPARATIONS.

SPECIFICATION forming part of Letters Patent No. 684,920, dated October 22, 1901.

Application filed August 8, 1899. Serial No. 726,571. (No specimens.)

*To all whom it may concern:*

Be it known that I, ALPHONSE DENAEYER, chemist, a subject of the King of Belgium, and a resident of 3 Place Liedts, Brussels, Belgium, have invented a certain new Improved Manufacture of Cocoa, Chocolate, or other Alimentary Substances with Milk, of which the following is a specification.

This invention relates to an improved manufacture of alimentary substances, more particularly cocoa or chocolate, combined with milk.

The cocoa and chocolate powders of commerce as heretofore prepared are subject to the inconvenience of requiring to be boiled for some time with water in order to effect their proper solution. The difficult solubility of these substances arises from the fact that all the known products of this kind are too dense—that is to say, the molecules of which they are composed cohere too closely together to enable the water to gain ready access thereto, whereby the solution thereof is greatly retarded, even by means of hot water.

The present invention relates to a process of preparing such alimentary substances whereby I am enabled to obtain, for example, compounds of cocoa or chocolate and milk in the form of a light powder or flocculent or spongy mass containing variable proportions of cocoa or chocolate and milk and, if required, sugar that will instantly dissolve in hot water and that are also soluble in cold water.

The solutions obtained present the appearance, odor, and flavor of chocolate and cocoa mixed with milk prepared in the usual manner.

The great solubility of the products obtained by my new process is mainly due to the employment in the manufacture of a vacuum or exhaust, and this constitutes an essential characteristic of my invention, this being the only means of obtaining the high degree of solubility above mentioned.

If a certain quantity of milk be placed in an evaporating-pan heated on a water-bath under continual stirring, and if to this milk be added a suitable proportion of sugar—such, for instance, as twenty-five per cent., by weight—and the evaporation be continued, a syrup-like mass will be obtained, which in cooling will become more and more consistent. If this syrupy mass be then introduced into a vacuum-pan, so as to evaporate the rest of the water under vacuo at a temperature of about 80° centigrade, a very light milk powder will be obtained in the form of a spongy or flocculent mass of a white color, which is instantly soluble in hot water, thereby reconstituting the natural milk, which may be in a dilute or concentrated form, according to the amount of water added. According to my invention I employ this same method of operating for the manufacture of compounds of cocoa or chocolate and milk. For this purpose I add in the above-described treatment of the milk and sugar mixture at the required moment before introduction into the vacuum-pan the requisite amount of cocoa either with or without its fatty constituents, (according to the product desired to be obtained,) and I then subject this mixture to the action of a suitable vacuum evaporating apparatus. Thus if, for example, there be added to the mixture of sugar and milk, while contained, still hot, in the water-bath evaporator with stirring device, cocoa in the form of powder from which the fatty matter has been extracted, taking, for example, a quantity equal to thirty per cent. of the milk compound (or more or less according to requirements) and this compound be then evaporated to dryness under vacuum or exhaust, then will be obtained the above-described compound of sweetened cocoa and milk. If under the same conditions and in analogous proportions ground cocoa still containing all or part of its fatty constituents be added to the milk-sugar compound, sweetened chocolate-milk compound will be obtained. These compounds of sweetened cocoa or chocolate and milk treated as above described—that is to say, evaporated to dryness in a vacuum apparatus—will yield under these conditions a spongy or flocculent mass, which after thorough desiccation in a second vacuum apparatus can be readily reduced to powder by known means, constituting a cocoa or chocolate powder which is instantly soluble in hot water.

For carrying out the above-described manufacture I prefer to employ apparatus which I will describe with reference to the accompanying drawings, in which—

Figure 2:
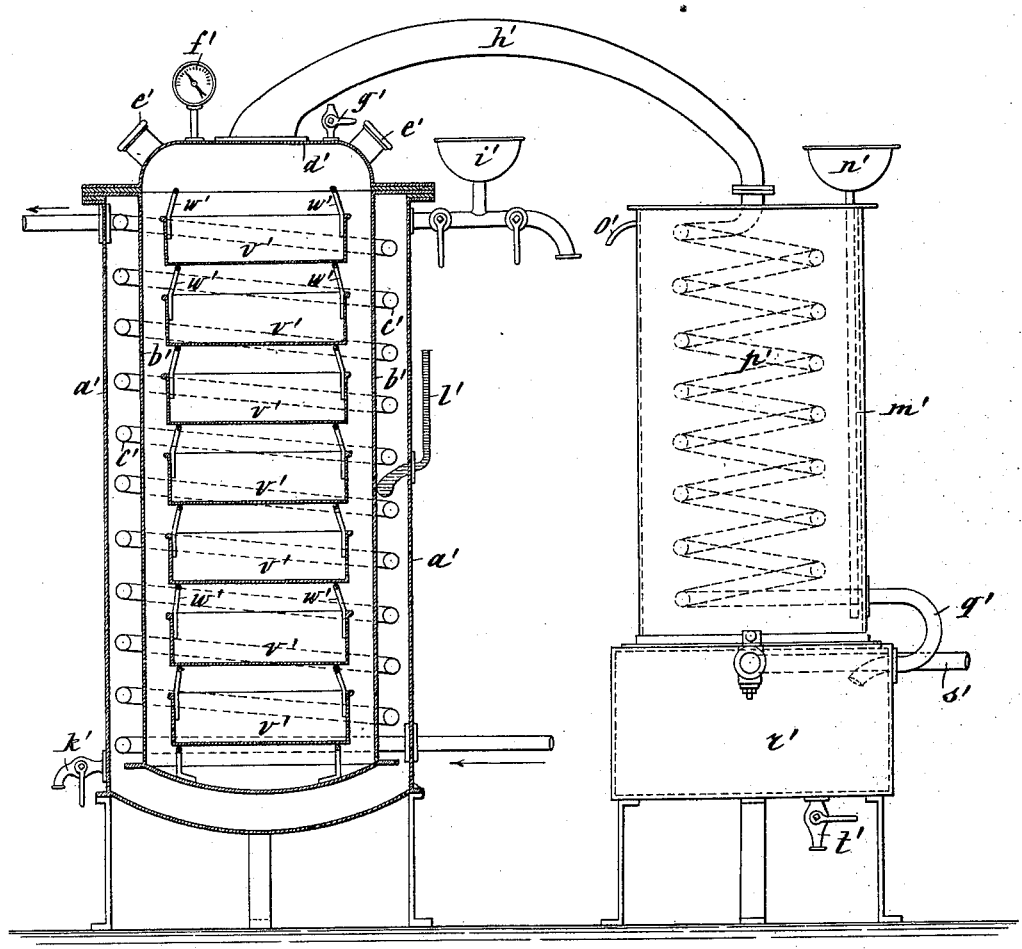

Figure 1 shows a sectional view of the preliminary evaporating and stirring apparatus; Fig. 2, the pneumatic vacuum or exhaust evaporating apparatus; and Fig. 3, the desiccating apparatus, also operating with vacuum.

The evaporating and stirring apparatus shown in Fig. 1, in which the condensed mixture of milk and sugar is first prepared and afterward the mixture of milk, sugar, and cocoa or chocolate, as above described, does not present any special novel features of construction. It is composed of a pan $a$, fitted in a bath $b$, heated by water, steam, or other suitable fluid medium and having for that purpose an inlet and an outlet $c$ and $d$ and a discharge-cock $e$. In the pan $a$ is mounted a shaft $g$ with stirring-blades and rotated by a transmission-pulley $h$ or otherwise.

The vacuum evaporating apparatus shown at Fig. 2 consists of a casing $a'$ of some height, within which is suspended a closed vacuum vessel of column shape $b'$ of smaller diameter and in the space between this and the casing is fitted a pipe-coil $c'$, through which circulates steam or other hot fluid for maintaining the vessel $b'$ at the required temperature. The annular space between $a'$ and $b'$ is also filled in with water or other suitable liquid, so as to constitute a water-bath for the vacuum apparatus $b'$. The closed top $d'$ of the vacuum vessel has, first, glass sight-holes $e'$; secondly, a vacuum-gage $f'$; thirdly, an air-admission cock $g'$, and, fourthly, a branch pipe $h'$, connecting the vessel with the condenser. The top $d'$ rests with a flange, with the interposition of packing-rings, upon a broad flange on the vessel $b'$, which flange also serves to inclose the annular space between $a'$ and $b'$. $i'$ is a charging-funnel for filling the annular space with liquid, and $k'$ is a discharge-cock for emptying the space. $l'$ is a thermometer for indicating the temperature of the water-bath. Into the vacuum vessel $b'$ are introduced, one above the other, the pans $v'$ $v'$, containing the mixture of cocoa or chocolate and milk and sugar, which has been partially condensed in the pan $a$, Fig. 1. The pans $v'$ are provided with upward-projecting handles $w'$ $w'$ of such a form as also to constitute supports for the pan above, while leaving the pan below perfectly open. Any required number of charged pans can thus be placed in one and the same vacuum evaporating vessel, so as to be simultaneously subjected to the heat and exhaust. At the side of the vacuum vessel is arranged the closed condenser $m'$, which is charged with cold water through a funnel $n'$, having a pipe leading down to the bottom of the casing, while at top is provided a discharge-pipe $o'$. Within the vessel is a pipe-coil $p'$, the upper end of which is connected to the pipe $h'$ of the vacuum evaporating apparatus, while at the lower end it is connected by a bend $q$ with the tank $r'$ for receiving the water of condensation produced in the coil, which tank is also connected by a pipe $s'$ with a suitable exhaust-pump. As the water collects in the tank it is discharged from time to time through the cock $t'$. Any other suitable known construction of condenser can be employed in place of that above described.

The desiccating apparatus, Fig. 3, in which the compound is treated after removal from the vacuum vessel, consists of a cylinder $a^2$, closed air-tight at top by a glass cover $b^2$ with packing and connected by a pipe $d^2$ with an air-pump. In the vessel $a'$ is a perforated false bottom $e^2$, below which is placed a charge of quicklime, formed into blocks, for absorbing moisture and giving off the heat generated thereby to the pans charged with compound placed on the false bottom $e^2$.

Having now particularly described and ascertained the nature of this invention and in what manner the same is to be performed, I declare that what I claim is—

The herein-described process of producing lacteous cocoa and chocolate preparations in a light flaky, spongy and easily-digestible form, consisting of rapidly condensing in the open air, to the consistency of cream, a mixture of milk and sugar, then adding thereto pulverized cocoa, subjecting the mass so obtained in a thin layer in a vacuum to the action of a heat of about 80° centigrade and finally drying it completely by vacuum, substantially as described.

In witness whereof I have hereunto set my hand in presence of two witnesses.

A. DENAEYER.

Witnesses:
 UBERT KAISER,
 FR. HILDESHEIM.